PHASE QUADRATURE-PLURAL CHANNEL DATA TRANSMISSION SYSTEM

Filed Aug. 19, 1966 2 Sheets-Sheet 1

INVENTOR
ROBERT M. MUÑOZ
BY
ATTORNEYS

INVENTOR
ROBERT M. MUÑOZ
BY
[signature]
[signature]
ATTORNEYS

United States Patent Office 3,456,193

Patented July 15, 1969

3,456,193

PHASE QUADRATURE-PLURAL CHANNEL DATA TRANSMISSION SYSTEM

Robert M. Muñoz, Los Altos, Calif., assignor to the United States of America as represented by the Administrator of the National Aeronautics and Space Administration Filed Aug. 19, 1966, Ser. No. 574,284
Int. Cl. H04j 3/04
U.S. Cl. 325—60 9 Claims

ABSTRACT OF THE DISCLOSURE

A communication system utilizing quadrature modulation and complementary demodulation. The input data is modulated by a modulating oscillator having two quadrature phased signals, and the modulated data is transmitted over two channels to a demodulator which includes a demodulating oscillator. One transmission channel carries the in-phase portion of the modulated data while the second channel carries the quadrature portion of the modulated data. A third channel may be employed to transmit a phase-lock signal between the modulating oscillator and the demodulating oscillator. The system is capable of transmitting input signals having frequencies which are below, at, or above the carrier frequency; and the bandwidth of the transmission channels may be less than the bandwidth of the information.

The invention described herein was made by an employee of the United States Government and may be manufactured and used by or for the Government for governmental purposes without the payment of any royalties thereon or therefor.

This invention relates in general to carrier type communication systems, and relates more particularly to such systems where the frequency of the data is closely related to the frequency of the carrier.

In a copending application of the present inventor and William J. Kerwin and Michael G. Dix, Ser. No. 520,839, Jan. 13, 1966, assigned to the same assignee as this application, there is disclosed a system for removing or eliminating an unwanted modulation from data-bearing signals.

In the above-identified application, the invention is directed to the elimination of unwanted spin modulation effects produced in the outputs of sensors mounted in a spinning platform, such as a satellite. This elimination is effected by multiplying the quadrature sensor output signals by sine and cosine functions from an oscillator having a frequency corresponding to spin frequency of the satellite, and combining these multiplied signals in a predetermined manner to produce signals which are a measure of the sensor outputs with the spin modulation effects removed.

The present invention is an extension of the teachings of the above-identified application to a carrier type communication system employing modulation and demodulation. In this invention, an input process is modulated by a modulating oscillator and the modulated signal transmitted over at least two channels to a demodulator which includes a demodulating oscillator. One transmission channel carries the in-phase portion of the modulated data, while the second channel carries the quadrature portion of the modulated data. A third channel may be employed to transmit a phase-lock signal between the modulating oscillator and the demodulating oscillator. In the modulator, the data input modulates the output signals of a reference oscillator having two sine and cosine function outputs displaced 90 degrees from each other.

These modulated signals are transmitted by a suitable data link to a demodulator. In a demodulator, the modulated signals are multiplied in a predetermined fashion by the output signals from a second oscillator which has the same frequency as the modulating oscillator and which also generates two sine and cosine function output signals which are displaced 90 degrees from each other. These multiplied outputs are then selectively combined in summing networks or devices to produce two signals which correspond, respectivley, to the in-phase and quadrature components of the data. If there is no phase shift between the modulating oscillator and the demodulating oscillator, the demodulated output of the second channel will be zero at all times, so that the output of the first summing device will represent the complete magnitude of the input signal. The present invention is particularly effective for transmitting data band frequencies which are below, at, or above the frequency of the modulated carrier wave.

It is therefore an object of this invention to provide an improved carrier type communication system which is capable of passing data band frequencies which are below, at, or above the carrier frequency.

It is a further object of this invention to provide a carrier type communication system employing modulation by the input data of two quadrature output signals of a reference oscillator having a predetermined frequency, and the demodulation of these modulated signals by the quadrature output signals of a demodulating oscillator having the same predetermined frequency as the reference oscillator.

It is an additional object of the present invention to provide a carrier type communication system employing modulation by the input data of two output signals of a reference oscillator, these output signals representing sine and cosine functions of a predetermined carrier frequency, and the demodulation of these modulated signals by multiplying them with the output signals of a demodulating oscillator which produces sine and cosine functions of the predetermined carrier frequency.

Objects and advantages other than those set forth above will be apparent from the following description, when read in connection with the accompanying drawings, in which.

Figure 1:
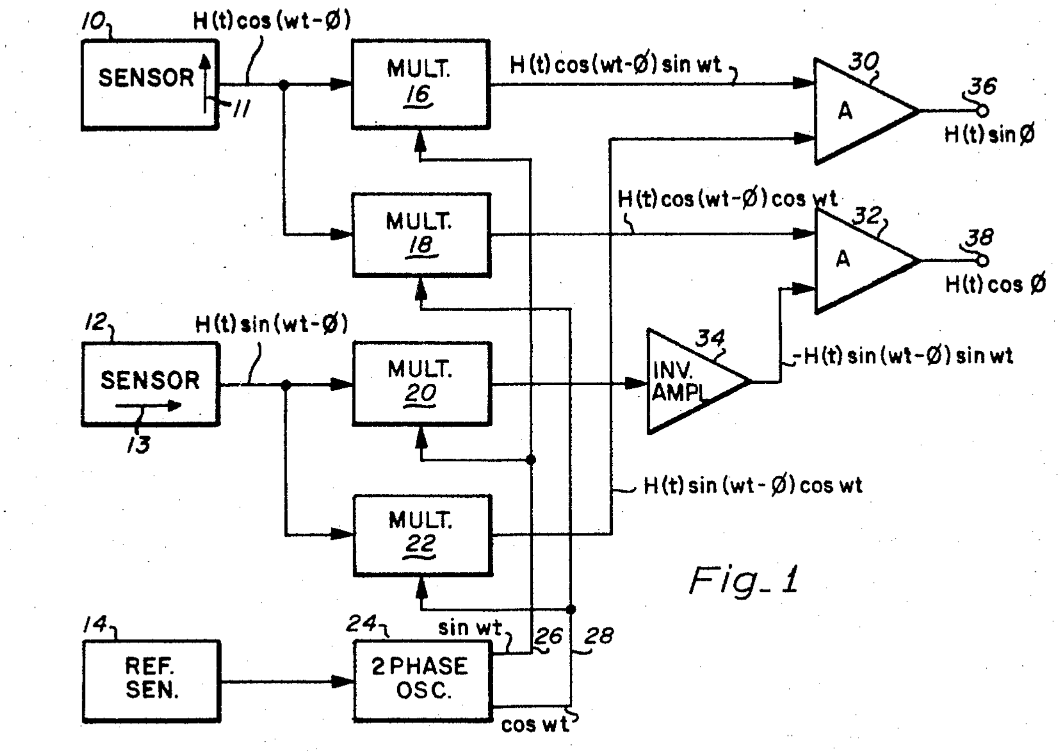
FIGURE 1 is a block diagram of the system of the above described copending application.

The present invention can best be understood by first referring to the system of the above-identified copending application as shown in FIGURE 1. Reference numerals 10 and 12 identify a pair of directional sensors whose outputs are modulated by the spinning of a platform on which they are mounted. Sensors 10, 12 have their axes of sensitivities displaced 90 degrees from each other, as indicated by the arrows 11, 13, and are employed to measure variations in a quantity identified as $H(t)$ in in the vector diagram of FIGURE 2. The platform is assumed to be spinning at an angular velocity $w$, measured in radians per second, and it is this spinning velocity which produces the modulation of the outputs of sensors 10, 12.

Figure 2:
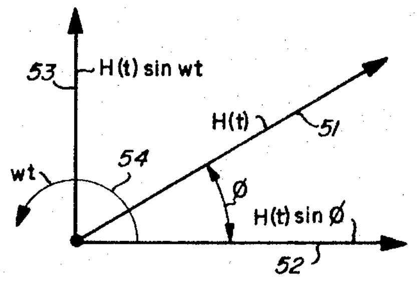
FIGURE 2 is a vector diagram explaining the operation of the system of this invention.

In the vector diagram of FIGURE 2, line 52 represents a reference direction along which the axis of sensor 10 is disposed, line 53 represents the axis along which the axis of sensor 12 is disposed, and line 51 indicates the direction of the variable or phenomena H($t$) being measured. Further, the angle $\phi$ is that between the fixed reference line 52 and the variable to be measured, and curved line 54 represents the angular motion $wt$ of the spinning platform, this angular motion producing a modulation of the outputs of sensors 10, 12. From FIGURE 2, it will be seen that the output signal of sensor 10 is $H(t)\cos(wt-\phi)$, and that the output of sensor 12 is $H(t)\sin(wt-\phi)$.

Referring again to FIGURE 1, the output signal from sensor 10 is supplied as one input to each of a pair of multipliers 16, 18, while the output signal from sensor 12 is supplied as one input to each of a pair of multipliers 20, 22. Each of multipliers 16, 18, 20 and 22 receives another input from a two phase oscillator 24. Oscillator 24 produces two phase-displaced output signals, one of which corresponds to sin $wt$ and appears on line 26, and the other of which corresponds to cos $wt$ and appears on a line 28. The sin $wt$ signal on line 26 is supplied as an input to each of multipliers 16 and 20, while the cos $wt$ signal on line 28 is supplied to each of multipliers 18 and 22. Two phase oscillator 24 is driven by a reference generator 14 which is locked in phase and frequency with the spinning platform.

The output signals from multipliers 16 and 22 are combined in a summing amplifier 30, while the output signals from multipliers 18 and 20 are combined in a summing amplifier 32, after inversion of the output signal of multiplier 20 in an inverting amplifier 34. The output from summing amplifier 30 appears at a terminal 36 and corresponds to $H(t)\sin\phi$, and the output of summing amplifier 32 appears at a terminal 38 and corresponds to $H(t)\cos\phi$. That this relationship prevails for the signals appearing on terminals 36 and 38 can be established by the following:

Recalling that the output of sensor 10 corresponds to $H(t)\cos(wt-\phi)$, and the output of sensor 12 corresponds to $H(t)\sin(wt-\phi)$, the output of multiplier 16 will be seen to be $$H(t)\cos(wt-\phi)\sin wt \quad (1)$$

The output from multiplier 18 is $$H(t)\cos(wt-\phi)\cos wt \quad (2)$$

The output from multiplier 20 is $$H(t)\sin(wt-\phi)\sin wt \quad (3)$$

The output from multiplier 22 is $$H(t)\sin(wt-\phi)\cos wt \quad (4)$$

The summing of the output signals from multipliers 16 and 22 in amplifier 30 produces an output signal Y on terminal 36 represented by:

$$Y=H(t)\ [\cos(wt-\phi)\sin wt+\sin(wt-\phi)\cos wt]=H(t)\sin\phi \quad (5)$$

Similarly, the summing of the output signals of multipliers 18 and 20, after inversion of the output of multiplier 20 in inverter 34, produces an output signal X on terminal 38 represented by:

$$X=H(t)\ [\cos(wt-\phi)\cos wt-\sin(wt-\phi)\sin wt]=H(t)\cos\phi \quad (6)$$

Thus, the two output signals shown by Equations 5 and 6 correspond to the two components of H($t$) projected along the reference direction (line 52) and a direction perpendicular to the reference direction (line 53), and are independent of the angular velocity of the sensor mounts. Since the effect of the modulation by the spinning platform has been eliminated, it can be seen that this technique is particularly effective for transmitting data whose frequency is below, at, or above the spin modulation frequency.

It will be understood that the foregoing relates to the subject matter of the above-identified copending application and forms no part of the present invention, it being presented here only for purposes of facilitating understanding of this invention.

Figure 3:
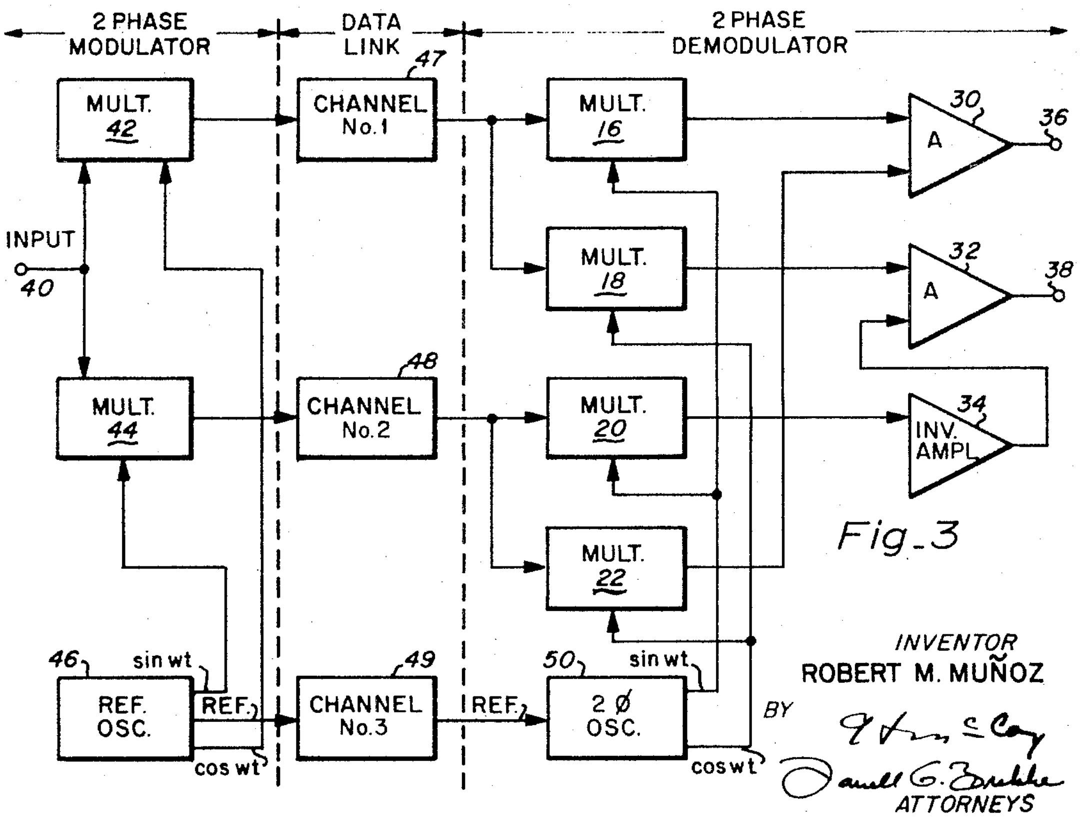
FIGURE 3 is a block diagram of one embodiment of the present invention, illustrating the use of three data channels.

FIGURE 3 illustrates one embodiment of the present invention applied to a carrier type communication system involving three data channels. As shown in FIGURE 3, the input data to be modulated for transmission and subsequent demodulation appears at an input terminal 40, and is supplied as inputs to each of a pair of multipliers 42 and 44. Multipliers 42, 44 each receive an input from a two phase reference oscillator 46. Oscillator 46 generates two phase-displaced output signals, one signal corresponding to sin $wt$ and the other signal corresponding to cos $wt$, $w$ being the angular velocity of the carrier frequency. Oscillator 46 may also produce a reference output signal on a third output line for providing a phase lock with the two phase oscillator in the demodulator.

The cos $wt$ signal from oscillator 46 is supplied as an input to multiplier 42 where it is multiplied with the input signal from terminal 40. The sin $wt$ signal from oscillator 46 is supplied as an input to multiplier 44 where it is multiplied with the input signal from terminal 40. The outputs of multipliers 42, 44 thus represent the modulated data-bearing signal, each output signal being displaced 90 degrees from the other.

The modulated outputs from multipliers 42 and 44 may then be transmitted in some suitable manner, such as through a data link represented by a channel 47 for multiplier 42 and a channel 48 for multiplier 44. The data link may also include a channel 49 for transmission of the phase-lock signal from oscillator 46.

The signals from the data link are supplied to a two phase demodulator which includes multipliers 16, 18, 20 and 22 as described above in connection with FIGURE 1. The signal from channel 47 is supplied as an input to each of multipliers 16 and 18, while the signal from channel 48 is supplied as inputs to each of multipliers 20 and 22. Each of the multipliers also receives an input from a two phase oscillator 50 which is locked in phase with modulating oscillator 46 by the signal transmitted on channel 49. Oscillator 50 produces two phase-displaced signals, one of which corresponds to sin $wt$ and is supplied to multipliers 16 and 20, and the other of which corresponds to cos $wt$ and is supplied to multipliers 18 and 22. These inputs from oscillator 50 act in a manner similar to that described above in connection with FIGURE 1 to multiply the input signals from channels 47 and 48 in a predetermined manner.

The output signals from multipliers 16 and 22 are supplied, as before, to a summing amplifier 30. The output signals from multipliers 18 and 20 are supplied to a summing amplifier 32, after inversion of the output of multiplier 20 in an inverting amplifier 34.

The output signals appearing on terminals 36 and 38 correspond to the in-phase and quadrature components of the demodulated data signal, respectively. The mathematical description presented above for the operation of the system of FIGURE 1 is an accurate description of the operation of the system shown in FIGURE 3. Thus, the modulation-demodulation system of the present invention is operable to pass data band frequencies which are below, at, or above the frequency of the modulated carrier. This is of particular advantage where the carrier frequency must be in the band of frequencies ordinarily occupied by input information, as in data amplifiers and tape recorders, for example.

Figure 4:
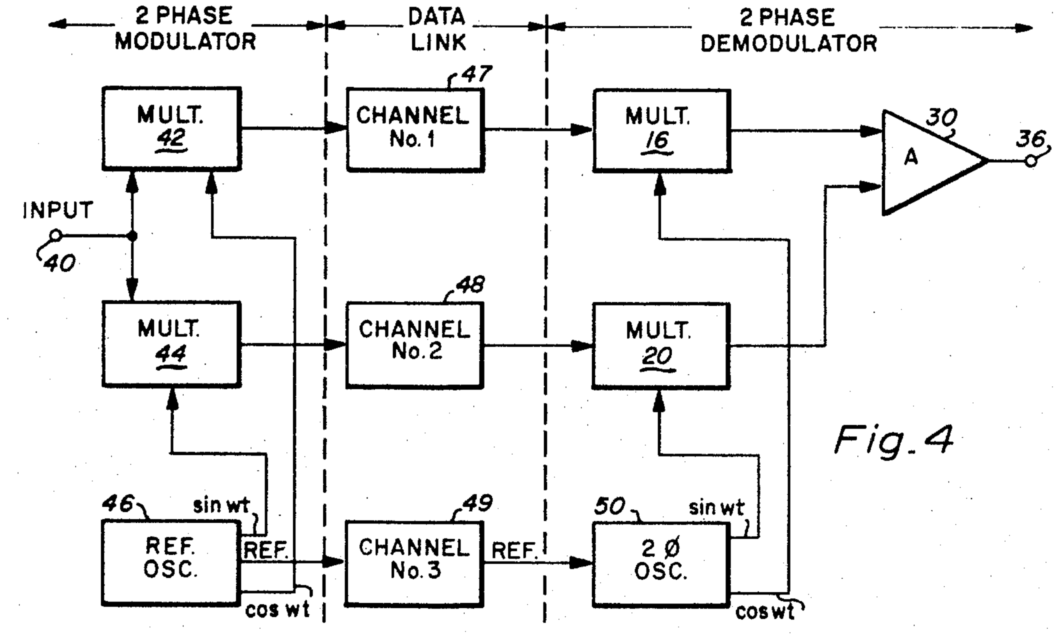
FIGURE 4 is a block diagram of an alternate simplified embodiment of the present invention for use where there is no phase shift between the modulating oscillator and the demodulating oscillator; and FIGURES *5a* and *5b* are diagrams illustrating the theory of operation of the invention when data frequencies at or near zero are to be employed.

If there is no phase shift $\phi$ between the modulating oscillator 46 and the demodulating oscillator 50, the demodulated output of the second channel will be zero at all times and the output of the first channel will represent the complete magnitude of the input signal. Under these conditions, the circuitry required to practice the present invention may be simplified to that shown in FIGURE 4. FIGURE 4 corresponds to the system of FIGURE 3 except that multipliers 18 and 20 have been eliminated, as well as amplifier 32 and inverting amplifier 34. The outputs of multipliers 16 and 22 are combined in summing amplifier 30 to produce an output on terminal 36 which corresponds to the complete magnitude of the input signal appearing at terminal 40. As indicated above, the system of FIGURE 4 could be further simplified by eliminating channel 49 for transmission of the phase lock signal between the oscillators, if this phase lock signal can be derived from either of the other two channels.

In order to show that the modulation-demodulation system of the present invention is capable of transmitting information beyond the normal capacity of an information channel, the following mathematical analysis is presented, along with the diagrams of FIGURE 5.

$$f_a(t)=\sum_{n=1}^{N} f_n(t)\cos(w_n t+\phi_n(t))=\sum_{n=1}^{N} f_n(t)\cos\alpha \quad (7)$$

Modulating with $\sin w_c t$ and $\cos w_c t$ where $w_c$ is the carrier frequency, we have $$f_b(t)=f_a(t)\sin w_c t \quad (8)$$

$$=\sum_{n=1}^{N} f_n(t)\cos\alpha\sin\beta \quad \Bigg| \begin{array}{l}\alpha=w_n t+\phi_n(t)\\ \beta=w_c t\end{array} \quad (9)$$

$$=\sum_{n=1}^{N}\frac{f_n(t)}{2}[\sin(\alpha+\beta)-\sin(\alpha-\beta)] \quad (10)$$

$$f_c(t)=f_a(t)\cos w_c t \quad (11)$$

$$=\sum_{n-1}^{N} f_n(t)\cos\alpha\cos\beta \quad (12)$$

$$=\sum_{n=1}^{N}\frac{f_n(t)}{2}[\cos(\alpha+\beta)+\cos(\alpha-\beta)] \quad (13)$$

filtering the upper sideband can be expressed in the following way:

$$f_d(t)=f(w)\sin(\alpha+\beta) \quad (14)$$

and if the same characteristic is applied to the quadrature signal, $$f_e(t)=F(w)\cos(\alpha+\beta) \quad (15)$$

substituting these filtered sidebands into Equations 10 and 13 gives:

$$f_f(t)=\sum_{n=1}^{N}\frac{f_n(t)}{2}f(w)\sin(\alpha+\beta)-\frac{f_n(t)}{2}\sin(\alpha-\beta) \quad (16)$$

$$f_g(t)=\sum_{n=1}^{N}\frac{f_n(t)}{2}f(w)\cos(\alpha+\beta)+\frac{f_n(t)}{2}\cos(\alpha-\beta) \quad (17)$$

It will be noted that the lower sidebands have been left unfiltered.

Demodulation can now be implemented by multiplying by $\sin w_c$, $\cos w_c$ and combining in the manner shown below.

First, multiplying Equation 16 by $\sin w_c$ we have:

$$f_h(t)=f_f(t)\sin\beta \quad (18)$$

$$=\sum_{n=1}^{N}\frac{f_n(t)}{2}f(w)\sin(\alpha+\beta)\sin\beta-\frac{f_n(t)}{2}\sin(\alpha-\beta)\sin\beta \quad (19)$$

$$f_i(t)=f_g(t)\cos\beta$$

$$=\sum_{n=1}^{N}\frac{f_n(t)}{2}f(w)\cos(\alpha+\beta)\cos\beta+\frac{f_n(t)}{2}\cos(\alpha-\beta)\cos\beta \quad (20)$$

expanding $$f_h(t)=\sum_{n=1}^{N}\frac{f_n(t)}{4}f(w)[\cos\alpha-\cos(\alpha+2\beta)]+\frac{f_n(t)}{4}[-\cos(\alpha-2\beta)+\cos\alpha] \quad (21)$$

$$f_i(t)=\sum\frac{f_n(t)}{4}f(w)[\cos(\alpha+2\beta)+\cos\alpha]+\frac{f_n(t)}{4}[\cos\alpha+\cos(\alpha-2\beta)] \quad (22)$$

summing Equations 21 and 22 we have $$f_j(t)=\sum_{n=1}^{N}\frac{f_n(t)}{2}\cos\alpha[1+f(w)] \quad (23)$$

This replicates the input for the cases where $f(w)=0$, or 1. All effects of the carrier at $w_c$ have been cancelled. This shows that full bandwidth information can be transmitted through a data channel having no capability of passing the upper sidebands. Some distortion is present if partial transmission of the upper sideband is allowed. It should be borne in mind that this argument depends on the assumptions made in the analysis and listed here:

(1) Only upper sideband attenuated.—This infers that if components of the lower sideband fold in such a way that they fall in a band of frequencies occupied by the upper sideband, the result will not be achieved perfectly unless there is some means to separate out such folded lower sidebands.

Figure 5A:
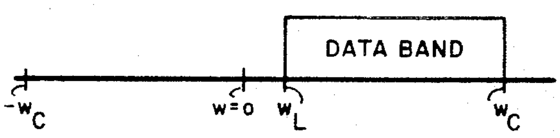
Figure 5B:
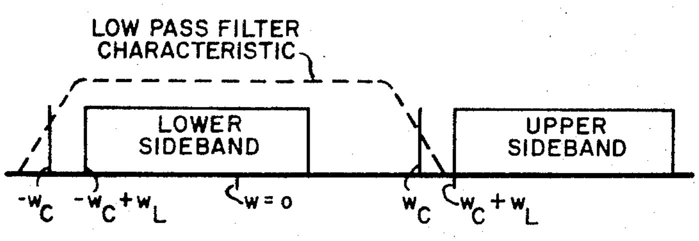

(2) $f(w)=0$ or 1.—This infers stone wall low pass filtering between upper and lower sidebands if data frequencies at or near zero are desired. A guard band between upper and lower sidebands can be generated by excluding data from the band between zero and some lower limit such as $w_L$, producing spectral components after modulation as illustrated in FIGURE 5*a*. The limit of operation for this technique allows data band frequency components as large as $2w_c$-$w_L$ and, as shown in FIGURE 5*b*, as low as $w_L$.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A carrier communication system for transmitting a data-bearing signal, comprising:

a first two phase oscillator providing first and second oscillator signals at a carrier frequency, said first and said second signals being displaced 90 degrees in phase from each other;

first and second multipliers, each adapted to receive two input signals and to provide an output signal which is a product of its two input signals;

means for applying said data-bearing signal and said first oscillator signal to said first multiplier;

means for applying said data-bearing signal and said second oscillator signal to said second multiplier;

a second two phase oscillator providing third and fourth oscillator signals at said carrier frequency, said third and said fourth signals being displaced 90 degrees in phase from each other;

third, fourth, fifth and sixth multipliers, each being adapted to receive two input signals and provide an output signal which is a product of its two input signals;

means for applying the output signal of said first multiplier to said third and said fourth multipliers;

means for supplying the output signal of said second multiplier to said fifth and said sixth multipliers;

means for supplying said third oscillator signal of said second two phase oscillator to said third and fifth multipliers;

means for supplying said fourth oscillator signal of said second two phase oscillator to said fourth and sixth multipliers;

means for combining the output signals of said third and sixth multipliers; and means for combining the output signals of said fourth and fifth multipliers, whereby two output signals are obtained which correspond to the in-phase and quadrature components of said data-bearing signal.

2. Apparatus as defined by claim 1 wherein said means for combining said output signals of said third and sixth multipliers and said means for combining said output signals of said fourth and fifth multipliers each comprise a summing amplifier.

3. Apparatus as defined by claim 2 wherein the means for combining the output signals of said fourth and fifth multipliers further comprises an inverting amplifier coupled between said fifth multiplier and said summing amplifier.

4. Apparatus as defined by claim 1 in which said first and said third oscillator signals are sine functions of said carrier frequency and said second and fourth oscillator signals are cosine functions of said carrier frequency.

5. Apparatus as defined by claim 1 including means for transmitting a phase-lock signal between said first oscillator and said second oscillator to maintain said oscillators in phase with each other.

6. A carrier communication system for transmitting data-bearing signals which are within a predetermined frequency band, comprising:

a first two phase oscillator providing first and second oscillator signals at a carrier frequency, said first and said second signals being displaced 90 degrees in phase from each other;

first and second multipliers, each adapted to receive two input signals and to provide an output signal which is the product of its two input signals;

means for applying said data-bearing signals and said first oscillator signal to said first multiplier;

means for applying said data-bearing signals and said second oscillator signal to said second multiplier;

a second two phase oscillator providing third and fourth oscillator signals at said carrier frequency, said third and fourth signals being displaced 90 degrees in phase from each other, said second oscillator being in phase with said first oscillator;

third and fourth multipliers, each being adapted to receive two input signals and provide an output signal which is the product of its two input signals;

a first data link for applying the output signal of said first multiplier and said third oscillator signal to said third multiplier, said link having a bandwidth narrower than that of said data-bearing frequency band;

a second data link for applying the output signal of said second multiplier and said fourth oscillator signal to said fourth multiplier, said second data link having a bandwidth narrower than that of said data-bearing frequency band; and means for summing the output signals from said third and said fourth multipliers to produce signals replicating said data-bearing signals.

7. Apparatus as defined by claim 6 in which said first and said third oscillator signals are sine functions of said carrier frequency, and said second and said fourth oscillator signals are cosine functions of said carrier frequency.

8. Apparatus as defined by claim 6 including means for transmitting a phase-lock signal between said first oscillator and said second oscillator to maintain said oscillators in phase with each other.

9. Apparatus as defined by claim 8 including a third data channel for transmitting said phase-lock signal between said first oscillator and said second oscillator.

References Cited

UNITED STATES PATENTS

| | | | |
|---|---|---|---|
| 3,204,035 | 8/1965 | Ballard et al. | 179—15 |
| 3,243,791 | 3/1966 | Currie | 325—65 X |
| 3,311,442 | 3/1967 | Jager et al. | 178—67 X |

ROBERT L. GRIFFIN, Primary Examiner

B. V. SAFOUREK, Assistant Examiner

U.S. Cl. X.R.

325—40, 63